Jan. 17, 1939.       V. W. KLIESRATH        2,144,022
CLUTCH CONTROL
Original Filed Aug. 28, 1931

INVENTOR.
VICTOR W. KLIESRATH
BY
ATTORNEY

Patented Jan. 17, 1939

2,144,022

UNITED STATES PATENT OFFICE 2,144,022

CLUTCH CONTROL

Victor W. Kliesrath, South Bend, Ind., assignor to Bragg-Kliesrath Corporation, South Bend, Ind., a corporation of New York Original application August 28, 1931, Serial No. 559,988, now Patent No. 2,042,717, dated June 2, 1936. Divided and this application April 23, 1936, Serial No. 76,031

1 Claim. (Cl. 192—3.5)

This invention relates in general to control mechanism and in particular to a mechanism for effecting a joint operation of the conventional change-speed transmission and clutch of an automotive vehicle.

The principal object of the invention is to provide a simple and compact manually operated lever device selectively operable to successively disengage the clutch and shift the gears of the transmission.

A further object of the invention is to provide a control mechanism for varying the relative timing of disengagement of the clutch and operation of the change-speed transmission to establish a desired gear ratio.

The invention also contemplates the provision of an easily fabricated and assembled cheap type of control device for effecting any one of a selective, intermittent, successive or concurrent operation of two control mechanisms.

Figure 1:
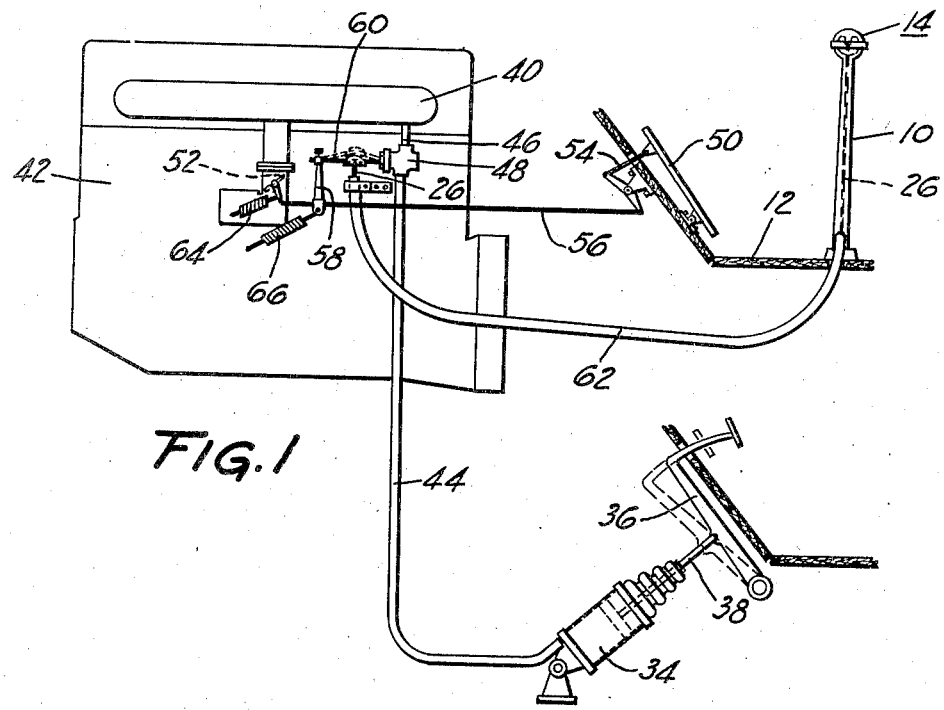
Figure 2:
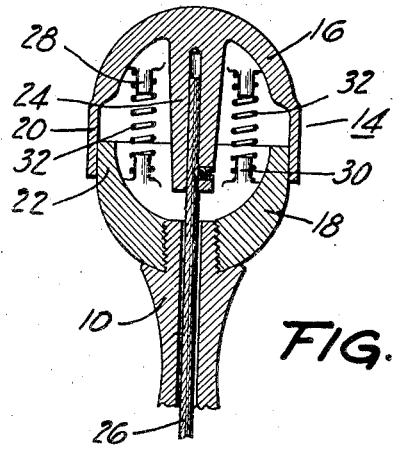

Other objects of the invention and desirable details of construction will become apparent from the following detailed description of a preferred embodiment of my invention, taken in conjunction with the accompanying drawing, in which:

Figure 1 is a diagrammatic view disclosing my invention adapted for use as a control of the transmission and clutch of an automotive vehicle; and Figure 2 is a sectional view disclosing the details of the control mechanism of my invention.

The control mechanism of my invention is of particular utility in effecting the operation of the clutch and change-speed transmission of an automotive vehicle. As disclosed in Figure 1, a lever 10, extending from the floor 12 of the driver's compartment, serves in the conventional manner to operate a conventional three-speeds forward and reverse transmission, not shown.

The lever 10 is hollow, as disclosed in Figure 2, the upper end thereof having detachably secured thereto a two-part hollow ball member 14 comprising parts 16 and 18. The rim portion of the part 16 is flared outwardly at 20 to telescopingly receive the peripheral portion 22 of the lower ball part 18. To the central portion of the part 16 is secured a boss 24, projecting inwardly with respect to the part 18. The boss 24 is bored to fixedly receive a flexible operating cable 26 extending through the bore of the lever member 10. Annularly spaced pins 28 extend inwardly from the surface of the ball part 16, said pins being disposed opposite similar pins 30 extending from the inner surface of the ball part 18. Return springs 32 are sleeved over the pins 28 and 30.

The flexible cable 26 is preferably arranged to control the operation of the clutch of the automotive vehicle, and to this end there is provided a power means for operating the clutch. The power means comprises a pressure differential operated motor 34 operably connected to a clutch pedal 36 by a rod 38. The power motor is provided with fluid transmitting means communicating with the intake manifold 40 of an internal-combustion engine 42 by means of conduits 44 and 46. These conduits are interconnected by a three-way valve 48. An accelerator pedal 50 is operably connected to an engine throttle 52 by means of a thrust link 54 and a flexible link 56. The valve 48 is so positioned as to be operated by the accelerator by means of an arm 58 secured to the flexible link 56 and to the valve 48 by a flexible member 60.

The cable 26 extends through a flexible sheath or conduit 62 and is secured at one end to the engine opposite the valve 48 and at the other end to the bottom of lever 10. The cable and sheath together constitute what is known in the art as a Bowden control. Return springs 64 and 66 function respectively to bias the throttle to its closed or engine idling position and to urge the valve 48 to a position to interconnect the manifold 40 and the motor 34 to energize the latter to disengage the clutch.

Referring now to the operation of the above-described mechanism, upon release of the accelerator the spring 64 automatically functions to close the throttle 52, and the spring 66 functions both to return the accelerator to its released or throttle closed position and to operate the valve 48 to connect the manifold 40 with the motor 34, whereupon the motor is energized to disengage the clutch. The control mechanism, comprising the ball 14 and Bowden control, constitutes a means for operating the valve 48 independently of the spring 66, whereby the relative timing of operation of the clutch and transmission may be regulated. In operation, pressure upon the upper ball part 16 by the palm of the hand serves to effect an operating movement of the cable 26 relative to the lever 10.

The mechanism disclosed in Figure 1 is disclosed and claimed in my Patent No. 2,042,717, dated June 2, 1936, of which this application is a division. However, it will be obvious that the control device of Figure 2 may find other uses than in the operation of mechanisms of the general type disclosed in Figure 1.

There is thus provided a simple and compact control mechanism, whereby two independent means to be operated may be selectively, intermittently, successively or concurrently operated.

While one illustrative embodiment has been described, it is not my intention to limit the scope of the invention to that particular embodiment, or otherwise than by the terms of the appended claim.

I claim:

In an automotive vehicle having an engine including a transmission and a clutch, power means to disengage the clutch, manually operable means to control the transmission including a tubular shift lever, flexible means for controlling the power means extending through said manually operable means, a two-part member mounted on the top of the aforementioned manually operable means for operating said flexible means, said two-part member including a cup-shaped member detachably secured to the manually operable means, a second cup-shaped member telescopingly mounted over the first-mentioned cup-shaped member and provided with a centrally located stem to which one end of the flexible means is secured, and springs, interposed between said cup-shaped members, serving to yieldingly bias the second-mentioned cup-shaped member to its off position.

VICTOR W. KLIESRATH.